US008438340B2

(12) United States Patent
Bohizic et al.

(10) Patent No.: US 8,438,340 B2
(45) Date of Patent: May 7, 2013

(54) EXECUTING ATOMIC STORE DISJOINT INSTRUCTIONS

(75) Inventors: Theodore J. Bohizic, Hyde Park, NY (US); Reid T. Copeland, Markham (CA); Marcel Mitran, Markham (CA)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 12/708,257

(22) Filed: Feb. 18, 2010

(65) Prior Publication Data

US 2011/0202729 A1  Aug. 18, 2011

(51) Int. Cl.
*G06F 12/00* (2006.01)
*G06F 13/00* (2006.01)
*G06F 13/28* (2006.01)

(52) U.S. Cl.
USPC ............ 711/150; 711/154; 711/156; 711/207

(58) Field of Classification Search .................. 711/207, 711/150, 154, 156
See application file for complete search history.

(56) References Cited

U.S. PATENT DOCUMENTS

| 5,551,013 | A | 8/1996 | Beausoleil et al. |
| 5,574,873 | A | 11/1996 | Davidian |
| 5,742,785 | A | 4/1998 | Stone et al. |
| 5,790,825 | A | 8/1998 | Traut |
| 5,870,598 | A | 2/1999 | White et al. |
| 6,009,261 | A | 12/1999 | Scalzi et al. |
| 6,308,255 | B1 | 10/2001 | Gorishek, IV et al. |
| 6,463,582 | B1 | 10/2002 | Lethin et al. |
| 7,296,120 | B2 | 11/2007 | Corrigan et al. |
| 7,340,569 | B2 * | 3/2008 | Goodman et al. ............ 711/151 |
| 2002/0087765 | A1 * | 7/2002 | Kumar et al. ................. 710/107 |
| 2004/0162951 | A1 * | 8/2004 | Jacobson et al. ............. 711/143 |
| 2008/0215830 | A1 | 9/2008 | Bohizic et al. |

OTHER PUBLICATIONS z/Architecture Principles of Operation, SA22-7832-07, Eighth Edition, Feb. 2009, 1344 pages.
"Load Pair Disjoint Facility and Instruction Therefore", Christian Jacobi et al., filed Feb. 18, 2010 (2 files—Application 77 pages, Drawings 19 pages).
Intel Itanium Architecture Software Developer's Manual, vol. 3: Instruction Set Reference, Revision 2.2, Jan. 2006, Intel Document Number: 245319-005, 986 pages.
Virtual Machines: Versatile Platforms for Systems and Processes (The Morgan Kaufmann Series in Computer Architecture Design), Jim Smith and Ravi Nair, 2005 by Elsevier Inc., ISBN: 1-55860-910-5, 95 pages.

* cited by examiner

*Primary Examiner* — Stephen Elmore
*Assistant Examiner* — Mark Giardino, Jr
(74) *Attorney, Agent, or Firm* — John E. Campbell; Dennis Jung

(57) ABSTRACT

A disjoint instruction for accessing operands in memory while executing in a processor of a plurality of processes interrogates a state indicator settable by other processors to determine if the disjoint instruction accessed the operands without an intervening store operation from another processor to the operand. A condition code is set based on the state indicator.

5 Claims, 12 Drawing Sheets

EXECUTING ATOMIC STORE DISJOINT INSTRUCTIONS

TECHNICAL FIELD

This invention relates, in general, to improving performance of a processing environment, and in particular, to instructions for interlocking disjoint storage operations.

BACKGROUND OF THE INVENTION

Enhancement of system performance continues to be an important aspect in designing and configuring processing environments. One way to improve system performance is to improve memory access.

U.S. patent application Ser. No. 11/680,703 "EMPLOYING A DATA STRUCTURE OF READILY ACCESSIBLE UNITS OF MEMORY TO FACILITATE MEMORY ACCESS" Filed Mar. 1, 2007 by IBM® and incorporated herein by reference teaches "A data structure of readily accessible units of memory is provided. The data structure includes designations of one or more units of memory that while represented in the data structure do not need expensive address translation, other tests or special handling in order to access the units of memory. By employing such a data structure, memory access and system performance are enhanced."

SUMMARY OF THE INVENTION

A multi-processor computer system may have instructions requiring more than one operand be fetched (or stored) atomically from/to memory without an intervening store to one of the operands during the operation. It is advantageous for such instructions to indicate whether or not there one of the operands may have been written to during the fetch (or store) causing the data of the operand to be corrupted. In a disjoint storage access instruction, a preferred indicator is the condition code set by the disjoint storage access instruction.

It is an object of the invention to accomplish executing a disjoint storage access instruction in a first processing unit of a plurality of processing units in a shared memory environment by performing a method comprising: executing a disjoint storage access instruction comprising: saving a first state value as a first value indicating the first processing unit is executing the disjoint storage access instruction, the first value indicating no intervening store has occurred, the first value being settable to a second value by another processor (processing unit) of the plurality of processors, the second value indicating an intervening store may have occurred to one of the one or more first operands; saving one or more first memory addresses for accessing corresponding one or more first operands of the disjoint storage access instruction; accessing the one or more first operands to perform a function of the disjoint storage access instruction; responsive to the saved first state value indicating that no intervening store occurred to the one or more first operands during the accessing, setting a first condition code value indicating a result of the accessing the one or more operands occurred atomically with no intervening store; and responsive to the saved first state value indicating that an intervening store may have occurred to one of the one or more first operands during the accessing, setting a second condition code value indicating a result of the accessing the one or more operands may not have occurred atomically and an intervening store may have stored to one of the one or more first operands; and then saving the first state value as a value indicating the first processing unit is not performing the disjoint storage access instruction.

Preferably, a store to memory instruction is executed for storing a second operand in memory comprising: obtaining saved first state values of the plurality of processing units; a second memory address of a location in memory of the second operand is obtained; responsive to a first state value of another processing unit of the plurality of processing units indicating the other processing unit is executing a disjoint storage instruction and determining said one or more first operands may overlap the second operand, modifying the saved first state value of the other processing unit to indicate an intervening store may have occurred; and the second operand is stored in memory at the second memory address.

In an embodiment, executing the store to memory instruction further comprises responsive to the first state value of another processing unit of the plurality of processing units indicating the other processing unit is executing the disjoint storage instruction and determining said one or more first operands may overlap the second operand, a global state value is modified to indicate an intervening store may have occurred; and the executing the disjoint storage access instruction further comprises responsive to the global state value indicating that no intervening store occurred to the one or more first operands during the accessing, the first condition code value is set indicating a result of the accessing the one or more operands occurred atomically with no intervening store.

In an embodiment, responsive to the disjoint storage access instruction being a Load Pair Disjoint (LPD) instruction, wherein the one or more first addresses consist of two first addresses, the two first addresses are determined based on respective general registers, an R1 field of the LPD instruction specifying one of said respective general registers and an R2 field of said LPD instruction specifying another of said respective general registers; and responsive to the special storage access instruction being the LPD instruction, the accessing the two first operands comprises fetching the two first operands from memory and saving a first fetched first operand in a first general registers specified by an R3 field of said LPD instruction and saving a second fetched first operand in a second general register specified by the R3 field. In an embodiment, a D1 field and a D2 field of the LPD instruction are arithmetically added to respective R1 and R2 general registers to form the two first addresses.

In another embodiment, the execution of the disjoint storage instruction further comprises signaling other processing units of the plurality of processing units to purge caches of entries corresponding to said one or more first addresses; and the execution of the store to memory instruction further comprises purging a cache of entries corresponding to said one or more first addresses.

In another embodiment, the caches consist of Translation Lookaside Buffers (TLBs) for dynamically translating virtual memory addresses to absolute memory addresses, further comprising: executing the store to memory instruction for the second operand in memory comprising: obtaining a second memory address of a location in memory of the second operand; performing a TLB lookup for the second memory address; responsive to the TLB lookup resulting in a TLB miss, performing a)-b): a) obtaining a second memory address of a location in memory of the second operand; and b) responsive to a first state value of another processing unit of the plurality of processing units indicating the other processing unit is executing a disjoint storage instruction and determining said one or more first operands may overlap the second operand, modifying the saved first state value of the other processing unit to indicate an intervening store may have occurred; and storing the second operand at the second memory address.

In another embodiment for emulating execution of a disjoint storage access instruction of a first processor architecture in a second processing unit of a plurality of processing units of a second processor architecture in a shared memory environment, execution of the disjoint storage access instruction is emulated comprising: determining that two operands of the disjoint storage access instruction to be fetched can be fetched atomically based on proximity of the two operands in memory; responsive to the two operands being within the proximity, executing an atomic instruction of the second processing unit to atomically fetch the two operands and setting a condition code to a first value indicating the two operands of the disjoint storage access instruction were fetched atomically with no intervening store to the two operands from another processor; and responsive to the two operands not being within the proximity, executing non-atomic instructions of the second processing unit to fetch the two operands and setting the condition code to a second value indicating that an intervening store may have occurred to one of the two operands.

In an embodiment, the proximity is any one of 16 bytes, a cache line or a memory page of pageable store.

Systems and methods relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, memory access is facilitated and system performance is enhanced by a capability that efficiently indicates those units of memory that are readily accessible. A unit of memory is readily accessible if address translation is not currently needed for the unit of memory (i.e., address translation has already been performed and the address is obtainable, or address translation is not needed), and if no other tests relating to the unit of memory, including access monitoring, need to be performed to access the unit of memory (i.e., there are no tests or they have previously been completed and do not need to be completed at the time of access).

If a unit of memory falls within this category, then a designation (e.g., one or more addresses) of that unit of memory is placed in a data structure, referred to herein as Translation Lookaside Buffer 0 (or TLB0). TLB0 includes designations of those units of memory that are immediately ready for access. While a unit of memory is in TLB0, no address translations or other tests relating to the unit of memory are performed. The unit of memory is ready for read/write access.

Figure 1:
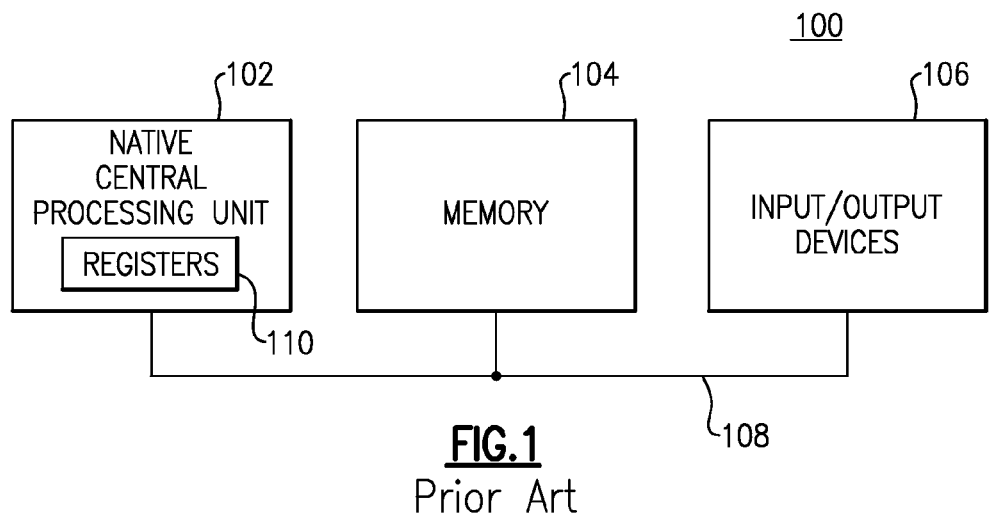
FIG. 1 depicts one embodiment of a prior art processing environment.

One embodiment of a processing environment to incorporate and use one or more aspects of the present invention is described with reference to FIG. 1. In this example, a processing environment 100 is based on one architecture, which may be referred to as a native architecture, but emulates another architecture, which may be referred to as a guest architecture. As examples, the native architecture is the Power4® or PowerPC® architecture offered by International Business Machines Corporation, Armonk, N.Y., or an Intel® architecture offered by Intel Corporation; and the guest architecture is the z/Architecture® also offered by International Business Machines Corporation. Aspects of the z/Architecture® are described in "z/Architecture Principles of Operation," IBM Publication No. SA22-7832-07, February 2009, which is incorporated by reference herein in its entirety.

Processing environment 100 includes, for instance, a native processor 102 (e.g., central processing unit (CPU)), a memory 104 (e.g., main memory), and one or more input/output (I/O) devices 106 coupled to one another via, for example, one or more buses 108 or other connections. As one example, processor 102 is part of a pSeries® server offered by International Business Machines Corporation (IBM®), Armonk, N.Y. IBM®, pSeries®, PowerPC® and z/Architecture® are registered trademarks of International Business Machines Corporation, Armonk, N.Y., U.S.A. Intel® is a registered trademark of Intel Corporation. Other names used herein may be registered trademarks, trademarks or product names of International Business Machines Corporation or other companies.

Native central processing unit 102 includes one or more native registers 110, such as one or more general purpose registers and/or one or more special purpose registers, used during processing within the environment. These registers include information that represent the state of the environment at any particular point in time.

To provide emulation in an embodiment, the processing environment includes an emulator program or programs running on a native computer system, a guest operating system program and one or more guest application programs. The emulator programs are designed to run on the native computer system having a native architecture. The guest programs are written to run on a computer system having a different architecture than the computer system (processor). The emulator program(s) running on the native computer system enable the native computer system to appear to support the function and instruction set required by the guest programs. These architected features are further described with reference to FIG. 2.

Figure 2:
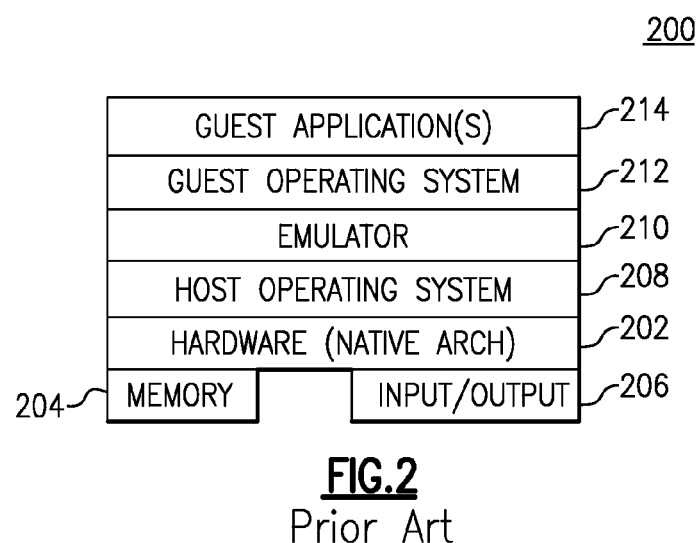
FIG. 2 depicts one embodiment of a prior art system architecture of the processing environment of FIG. 1.

Referring to FIG. 2, one embodiment of a system architecture 200 of a processing environment 100 is described. System architecture 200 includes, for instance, a plurality of implementation layers, which define the architected aspects of the environment. In this particular example, the layers include hardware 202, which is coupled to memory 204 and input/output devices and/or networks 206 via one or more interfaces and/or controllers; a host operating system 208; an emulator 210; a guest operating system 212; and one or more guest applications 214; as examples. One layer is coupled to at least one other layer via one or more interfaces. For instance, guest applications 214 are coupled to guest operating system 212 via at least one interface. Other interfaces are used to couple the other layers. Moreover, the architecture can also include other layers and/or interfaces. Various of the layers depicted in FIG. 2 are further described below.

Hardware 200 is the native architecture of the processing environment and is based on, for instance, Power 4, PowerPC®, Intel®, or other architectures. Running on the hardware is a host operating system 202, such as AIX® offered by International Business Machines Corporation, or LINUX. AIX® is a registered trademark of International Business Machines Corporation.

Emulator 210 includes a number of components used to emulate an architecture that differs from the native architecture. In this embodiment, the architecture being emulated is the z/Architecture® offered by IBM®, but other architectures may be emulated as well. The emulation enables a guest operating system 212 (e.g, z/OS®, a registered trademark of International Business Machines Corporation) to execute on the native architecture and enables the support of one or more guest applications 214 (e.g., Z applications). Further details regarding emulator 210 are described with reference to FIG. 3.

Figure 3:
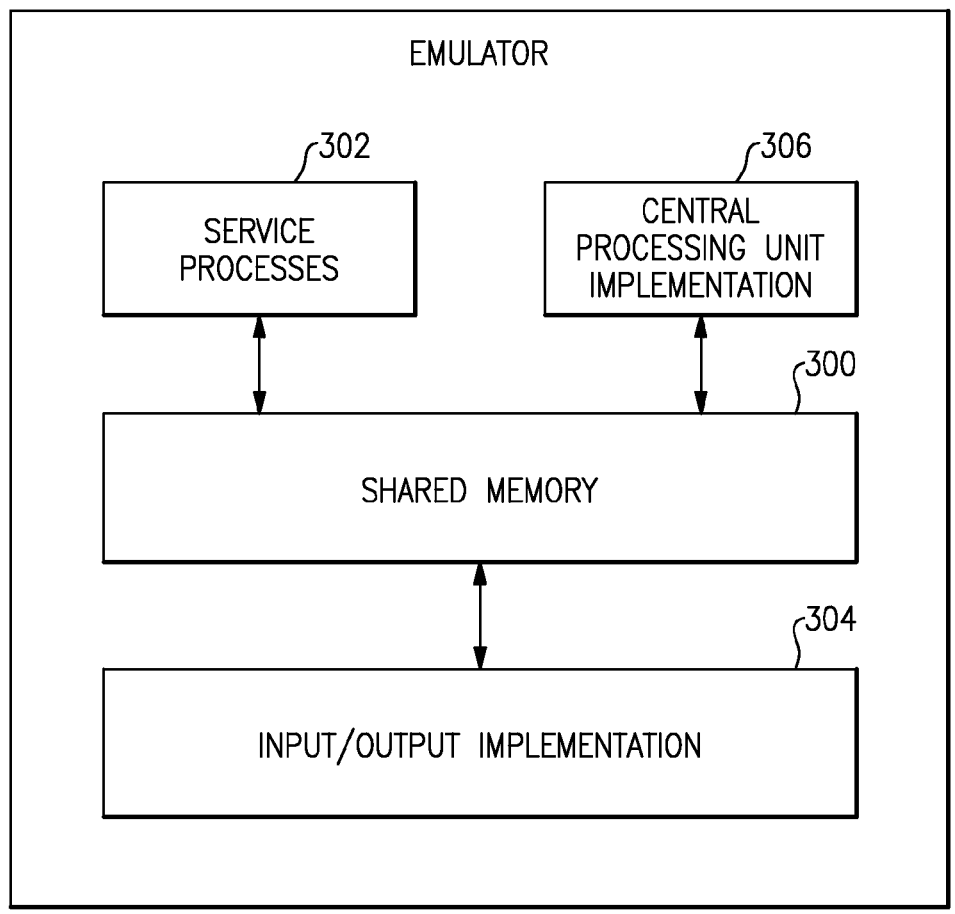
FIG. 3 depicts further details of one prior art embodiment of an emulator of the system architecture of FIG. 2.

Referring to FIG. 3, emulator 210 includes a shared memory 300 coupled to one or more service processes 302, an input/output (I/O) implementation 304, and a central processing unit (CPU) implementation 306, each of which is described in further detail below.

Shared memory 300 is a representation of a portion of memory in the host that is visible from service processes 302, I/O implementation 304, and CPU implementation 306. It is a storage area in which the independent processes (e.g., service processes, I/O implementation, CPU implementation) communicate by reading and storing data into the shared memory. As one example, the shared memory includes a plurality of regions including, for instance, system global information, CPU contexts and information, emulated main storage, emulated main storage keys, and subchannels (i.e., data structures that represent I/O devices).

Service processes 302 include one or more processes used to create the CPUs and one or more other processes, as well as provide architected operator facilities, such as start, stop, reset, initial program load (IPL), etc. It may also provide other functions, such as displays or alteration of emulated system facilities, obtaining/freeing shared resources, other maintenance commands, etc.

Input/output implementation 304 includes, for instance, one or more subchannel processes and an I/O controller used to communicate with I/O devices. The I/O controller is responsible for starting the subchannel processes and performing recovery, in one aspect of the present invention.

Central processing unit (CPU) implementation 306 is responsible for executing instructions and managing the processing. It includes a number of components, which are described with reference to FIGS. 4A-4B.

Figure 4A:
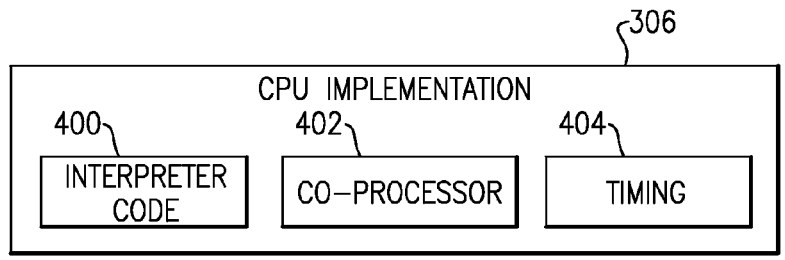
FIG. 4A depicts further details of one prior art embodiment of a central processing unit (CPU) implementation of the emulator of FIG. 3.
Figure 4B:
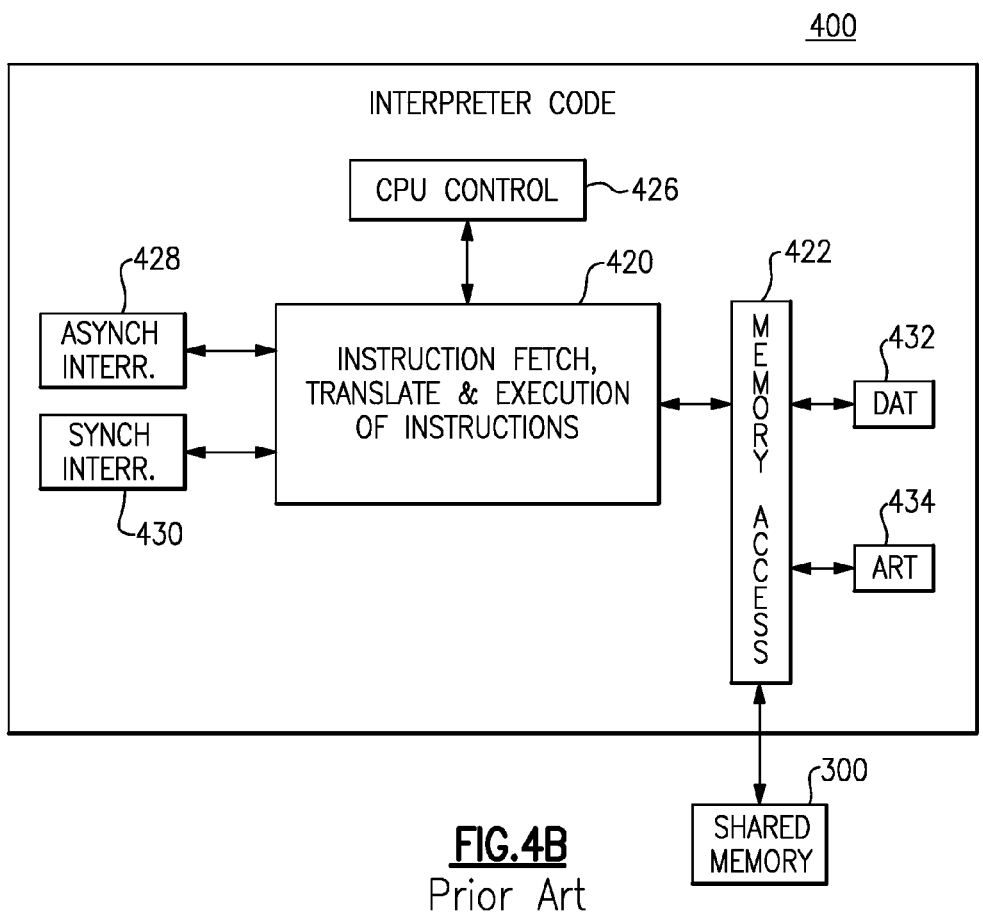
FIG. 4B depicts further details of one prior art embodiment of interpreter code of the CPU implementation of FIG. 4A.

Referring to FIG. 4A, CPU implementation 306 includes, for instance, interpreter code 400 used to fetch, translate and execute instructions; an architectured co-processor 402 that aids in initial start-up and communication with the chip (e.g., Service Call Logical Processor (SCLP) processes); and timing facilities 404 that are responsible for timing functions of the emulator. Further details regarding interpreter code 400 are described with reference to FIG. 4B.

Interpreter code 400 includes, for instance, an interpretation unit 420 coupled to a memory access unit 422, a CPU control 426, an asynchronous interruption handler 428 and a synchronous interruption handler 430.

Interpretation unit 420 is responsible for obtaining one or more guest instructions from memory, providing native instructions for the guest instructions, and executing the native instructions. The guest instructions comprise software instructions (e.g., machine instructions) that were developed to be executed in an architecture other than that of native CPU 102. For example, the guest instructions may have been designed to execute on a z/Architecture® processor, but are instead being emulated on native CPU 102, which may be, for instance, a pSeries® server.

In one example, the providing of the native instructions includes selecting a code segment in the emulator that is associated with the guest instruction. For instance, each guest instruction has an associated code segment in the emulator, which includes a sequence of one or more native instructions, and that code segment is selected to be executed.

In a further example, the providing includes creating during, for instance, a translation process, a native stream of instructions for a given set of guest instructions. This includes identifying the functions and creating the equivalent native instructions.

If an instruction includes a memory access, then memory access routines 422 are used to access shared memory 300. The memory access routines may use translation mechanisms such as dynamic address translation (DAT) 432 or access register translation (ART) 434 to translate a logical address to an absolute address, which is then used to access the memory or may be further translated, if needed.

In this embodiment, the processing within interpretation unit 420 is to be streamlined. Thus, if a more complex circumstance arises, such as a wait state, changing from one architecture level to another architecture level (e.g., z/Architecture® to ESA/390, etc.), control is transferred to CPU control 426, which handles the event and then returns control to interpretation unit 420.

Further, if an interrupt occurs, then processing transitions from interpretation unit 420 to either asynchronous interruption handler 428, if it is an asynchronous interruption, or synchronous interruption handler 430, if it is a synchronous interruption. After the interrupt is handled, processing returns to interpretation unit 420.

In particular, the interpretation unit monitors certain locations in shared memory and if a location has changed, it signifies an interrupt has been set by the CPU or I/O. Thus, the interpretation unit calls the appropriate interruption handler.

To facilitate memory access, some architectures, such as the z/Architecture® offered by International Business Machines Corporation, use a Translation Lookaside Buffer (TLB) (referred to herein as TLB1 in an example embodiment) to store addresses that have been translated by Dynamic address translation (DAT) or Access Register Translation (ART), as examples. Then, when a request is received for a page of memory addressed by a translated address, the address is used without having to wait for the expensive translation to be performed.

Although TLB1 includes designation of pages of memory that have been address translated, a page represented in TLB1 still may not be readily accessible. Instead, one or more other tests, such as access monitoring, may need to be performed before the page can be accessed. Thus, in accordance with an aspect of the present invention, a data structure, referred to herein as TLB0, is provided that includes one or more addresses (or other designations) of pages (or other units) of memory that are immediately accessible in that address translation has been performed and no tests need to be performed at this time to access the memory page. For example, if an address of the page of memory has been address translated and access to that page does not require monitoring, then the page is represented in TLB0. Thus, if translation and any other required tests (e.g., access monitoring) have previously been performed for a page of memory and do not need to be repeated at memory access time, one or more addresses of that page are placed in TLB0.

Figures 5, 6:
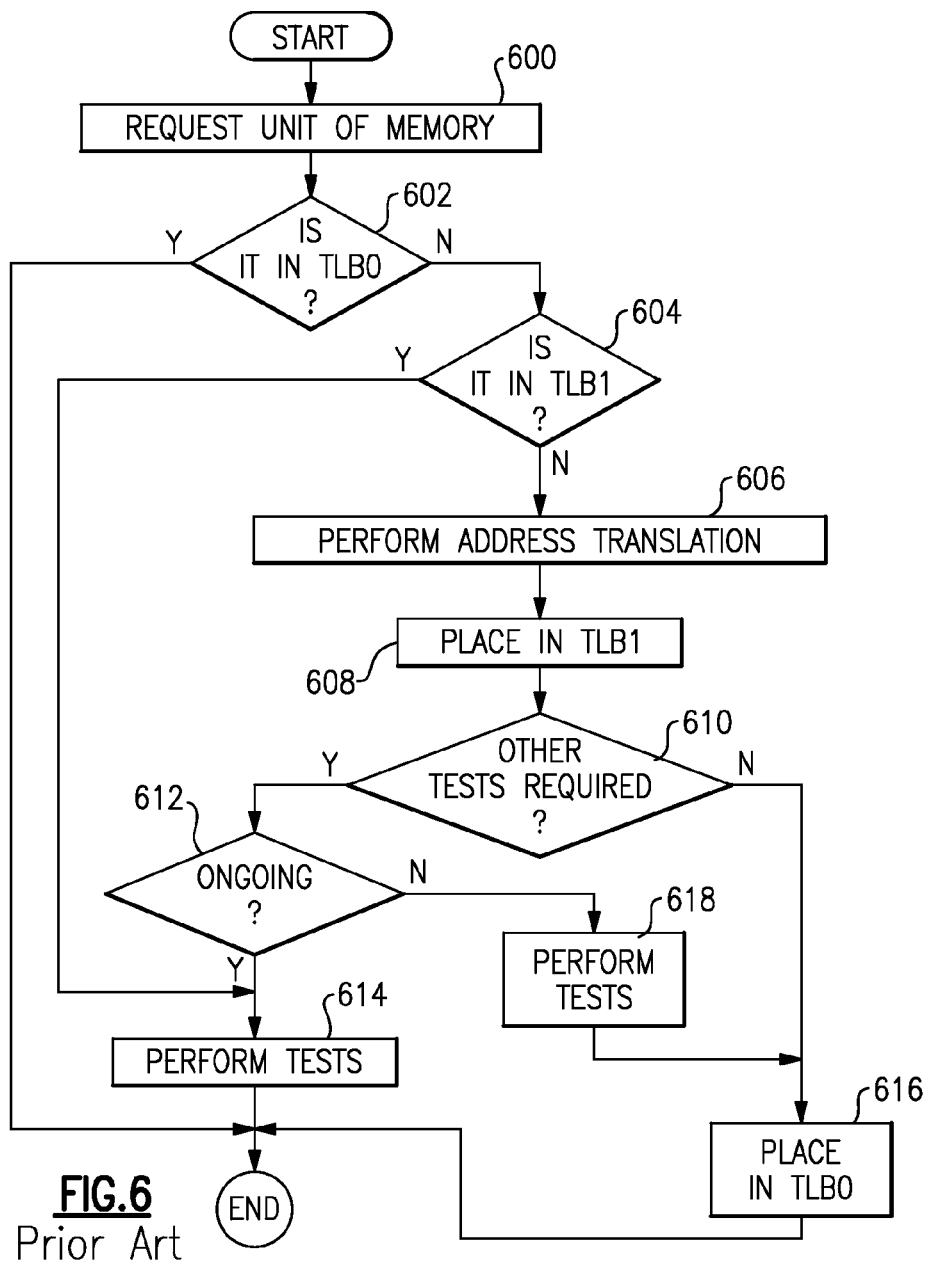
FIG. 5 depicts one prior art embodiment of an overview of translation lookaside buffers.
FIG. 6 depicts one prior art embodiment of the logic associated with placing units of memory in the buffers of FIG. 5.

As shown in FIG. 5, TLB0 500, as well as TLB1 502, reside in shared memory 300, and in particular, in the CPU contexts and information region of shared memory, in one example.

TLB0 500 is a collection of data. The data includes designation of one or more units of memory known to be accessible to the CPU. As one example, TLB0 includes, for instance, a pair of designations 504 for each unit of memory that is readily accessible. That is, when a unit of memory is represented in TLB0, it is known that it does not require the expensive address translations or any tests. In particular, it does not need address translation or access monitoring relating to the unit of memory. The designations are substantially immediately usable to access the unit of memory. As one example, each pair of designations includes a logical address and a host absolute address. In other embodiments, however, each pair of designations may include other types of addresses or other types of designations used to identify a unit of memory, such as a page of memory.

In one embodiment, there is a TLB0 for instructions that are to be fetched from memory and a TLB0 for data (e.g., operands, pages, etc.) that is to be fetched from memory. That is, in one example, there are separate TLB0s for different purposes. This is for performance enhancement. In other embodiments, there may be more or less TLB0s than described herein.

Similar to TLB0, TLB1 502 also includes a pair of designations for each unit of memory for which address translation has been performed. In one example, TLB1 is comprised of a plurality of TLB1s (e.g., 16 TLBs, one for each address space). Each TLB1 is tagged with the parameters used to create that TLB1. By having multiple TLB1s, as an operating system proceeds through sets of address spaces (at least one address space per process), the TLB1s retain translation information for multiple processes.

The TLB have an address space match criteria. The attributes that define a TLB1 are host or guest (SIE) information and the translation table origins as described in "z/Architecture Principles of Operation," IBM Publication No. SA22-7832-04, September 2005. When dynamic address translation parameters change, then the TLB1s are scanned for a parameter match. If no match, then the least recently used TLB1 is replaced and a new TLB1 is constructed.

During processing, the instruction fetching and operand accessing mechanisms can be using different TLB1s. In access register mode, each access register can specify a different TLB1. This is accomplished by having TLB1 anchors. Once a TLB1 is assigned to an address space, the TLB1 scan is avoided for each TLB0 miss. That is, a pointer is used to point to the current TLB1.

When address space parameters change, two actions are taken. The TLB0 is purged and the TLB1 anchors are cleared to zero. Memory accesses from that point miss TLB0 and drop down into the TLB1 code. The TLB1 code checks for a zero TLB1 anchor, and if the anchor is zero, performs a TLB1 selection. Otherwise TLB1 selection can be avoided for future memory accesses. The TLB1 lookup from that point on is a hash function based on bits from the virtual address.

A unit of memory that is in TLB1 may or may not be in TLB0, depending on whether access monitoring or other special testing is required. If no access monitoring or other testing is required, then the unit of memory in TLB1 can also be included in TLB0. A unit of memory in TLB0 is also in TLB1.

In accordance with an aspect of the present invention, a unit of memory is placed in TLB0 when, for instance, it is determined that any necessary or desired address translations or tests for that unit of memory are complete. In one example, the tests refer to access monitoring. Thus, if address translation for the unit of memory is complete (or not needed) and access to that unit of memory do not need to be monitored, as described in further detail below, then a designation of the unit of memory can be placed in TLB0. This is described in further detail with reference to FIG. 6.

In one embodiment, in response to the memory access component obtaining (e.g., receiving, having, fetching, being provided) a request for access of a particular unit of memory (e.g., a page of memory, or other size of memory), STEP 600, a determination is made as to whether a designation (e.g., address or other identifier of the unit of memory) is in TLB0, INQUIRY 602. If it is in TLB0, then this processing concludes and the memory access is performed using the designation in TLB0, as described further below with reference to FIG. 7.

However, if the designation is not in TLB0, then a further inquiry is made as to whether it is in TLB1, INQUIRY 604. If it is in TLB1 and not TLB0, then address translation has already been performed, and it is assumed that ongoing checks or further testing for this unit of memory are required, and therefore, it is ineligible for placement in TLB0. Thus, processing continues with perform tests, STEP 614, and the designation in TLB1 is usable for memory access, after the other tests are performed. However, in another embodiment, instead of assuming other tests are required, processing may continue with INQUIRY 610, as described below. This is beneficial in those situations in which the other tests are no longer required, and therefore, the unit of memory can be upgraded to TLB0.

Returning to INQUIRY 604, if the designation is not in TLB0 or TLB1 (e.g., first time the unit of memory is being accessed or the first time it is being accessed after a change causing translation to re-occur and/or other checks to be made once again), address translation is performed for the unit of memory, STEP 606. Any known address translation can be performed, including DAT and ART, as examples. Examples of DAT and ART are described in "z/Architecture Principles of Operation," IBM Publication No. SA22-7832-04, September 2005.

Subsequent to performing address translation, the unit of memory is placed in TLB1, STEP 608. For example, the logical address and host absolute address for the unit of memory is placed in TLB1. By placing the unit of memory in TLB1, its designation is usable to access the unit of memory without requiring performance of the expensive address translations. TLB1 lookup from that point on includes a hash function based on bits from the virtual address.

Moreover, a determination is made as to whether one or more other checks are necessary or desired to access the unit of memory, INQUIRY 610. In particular, a determination is made as to whether access of this unit of memory requires monitoring. As examples, a determination is made as to whether the unit of memory is subject to PER (Program Event Recording) monitoring or Store Stop monitoring; whether monitoring is needed to determine whether a store is into JITed (Just-in-Time compiled) code (i.e., cached code); whether the unit of memory is page 0; or whether any other tests (e.g., any tests, checks, conditions, etc.) apply. Performing these checks is described below.

For example, to determine if a page of memory has JITed code, and thus, is to be monitored, an indicator in a descriptor in the absolute page is checked that specifies whether there is JITed code. If the indicator specifies JITed code, then the page is ineligible for TLB0. As a further example, to determine if PER is active, the page address is compared to the beginning and ending of a defined PER range. If it falls within the range, the page is ineligible for TLB0. Similar testing is performed for Store Stop in which the page address is compared to a given range.

Should these tests be required, another inquiry is made as to whether those tests are ongoing, INQUIRY 612. That is, if the test cannot be satisfied by performing it once during this processing, but needs to be performed before each memory access or multiple times, then the unit of memory is not eligible for TLB0. Therefore, the tests are performed, STEP 614, and the unit of memory is accessible as appropriate, based on the tests.

Returning to INQUIRY 610, if no tests are required or desired, then the unit of memory is placed in TLB0, STEP 616. For example, the logical address of the unit of memory and its host absolute address are placed in TLB0.

Likewise, if one or more tests are required or desired, and can be satisfied by performing them one time during this processing (i.e., they do not need to be performed for each memory access or while the unit of memory is in TLB0), then the one or more tests are performed, STEP 618, and the unit of memory is added to TLB0, STEP 616.

When the unit of memory is in TLB0, it signifies that the unit of memory is readily accessible. No expensive address translations or other tests need to be performed in order to access the unit of memory. The unit of memory is accessible (e.g., address translated) and accesses to that unit of memory need not be monitored (i.e., no special handling for the unit of memory). The designation is retrieved from TLB0 and immediately usable (i.e., no tests or substantive translations need to be performed at this point in time) to access the unit of memory. This processing is further described with reference to FIG. 7.

Figure 7:
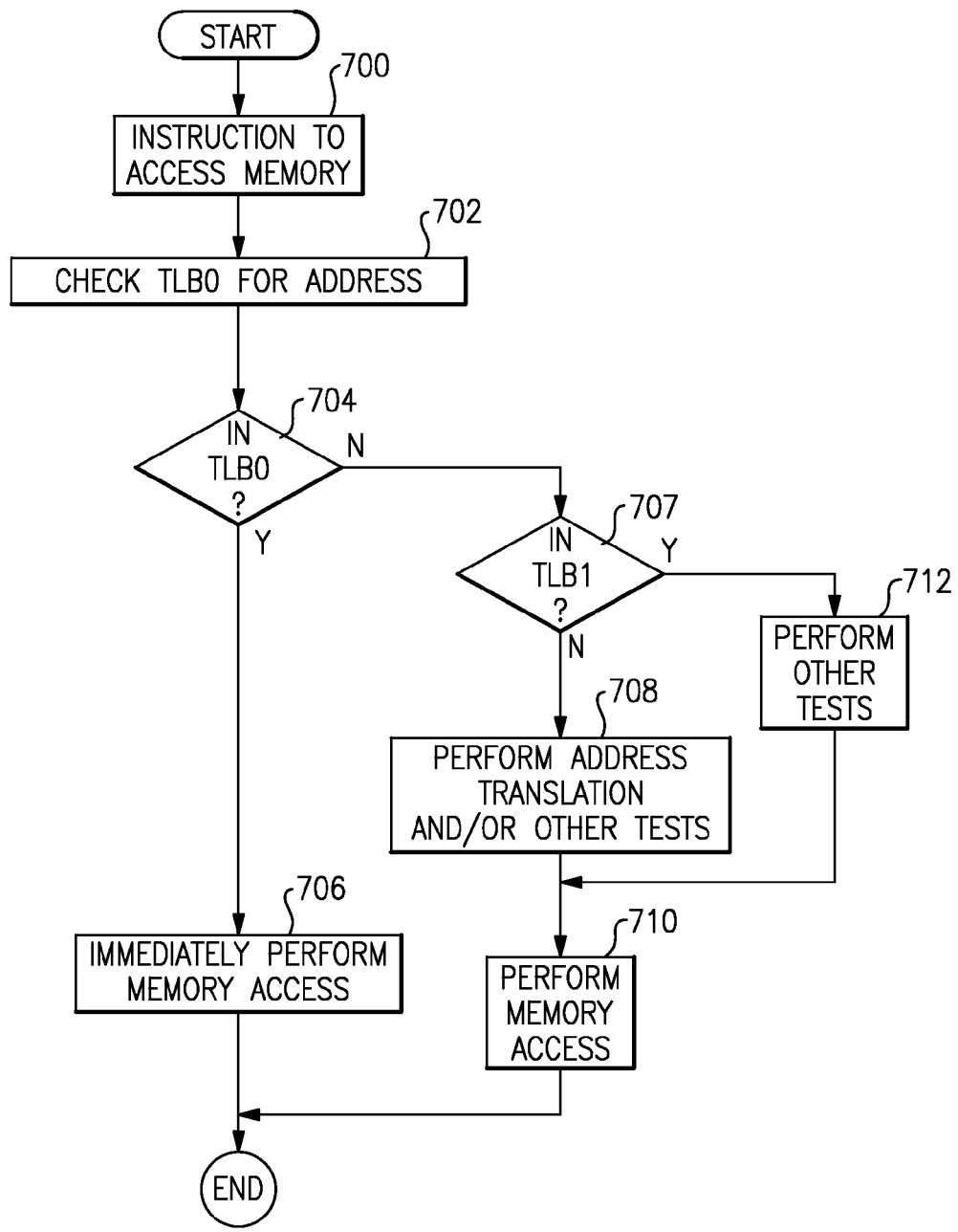
FIG. 7 depicts one prior art embodiment of the logic associated with accessing Translation Lookaside Buffer 0 of FIG. 5.

Referring to FIG. 7, processing associated with employing TLB0 to perform a memory access is described in further detail. This processing is performed by the memory access component, in one embodiment.

Initially, the memory access routines obtain (e.g., receive, fetch, are provided, have, etc.) an instruction or request to access a particular unit of memory, STEP 700. In response to obtaining the request, the memory access component checks whether a designation of the unit of memory is in TLB0, STEP 702. For instance, the logical address provided in the request is used in a hash function into TLB0. If the logical address is found, INQUIRY 704, then the absolute address corresponding to the logical address is obtained and usable in substantially immediately performing the memory access, STEP 706. That is, no expensive address translations or other tests are needed at this time to access the unit of memory.

On the other hand, if the logical address is not in TLB0, then a determination is made as to whether it is in TLB1, INQUIRY 707. If it is not in TLB1, then address translation and/or other tests need to be performed, STEP 708. Subsequent to performing any necessary translations and/or other tests, the unit of memory is accessed, STEP 710. Since address translation and/or one or more other tests are to be performed, the unit of memory is not readily or immediately accessible.

Returning to INQUIRY 707, if the unit of memory is represented in TLB1, but not in TLB0, then accesses to the unit of memory are monitored, STEP 712. That is, one or more special conditions apply that need to be monitored. For instance, if PER is active, a determination is made as to whether in PER range, etc. Subsequent or in addition to handling these conditions, memory access is performed, STEP 710.

During processing, state associated with the unit of memory may change, and therefore, address translation and/or one or more tests may need to be performed. For instance, PER or Store Stop may be made active for a unit of memory. In response to the memory access component making this determination of state change, the designation of the unit of memory is removed from TLB0. In one example, only that designation is removed, but in another example, all of TLB0 is purged and then re-loaded, as described above.

Described in detail herein is a capability to enhance memory access and system performance by providing a data structure that includes designations of those units of memory that are readily accessible. By using TLB0, inline checks do not need to be performed. It is assumed that all of the checks needed to access the unit of memory have been made. In contrast, when a unit of memory is not represented in TLB0, one or more of the monitoring checks (e.g., Is it page 0?, Per active?, Store Stop active?, JITed code?) need to be performed inline (e.g., at the time of access).

Load Pair Disjoint (LPD) Emulation:

As computer architectures advance, new functionality is introduced. For example, a disjoint operand instruction of the instruction set of a computer architecture, may atomically operate on two or more separate and distinct operands without any sort of interlocking mechanism for preventing other facilities from changing the operands during the atomic operation. In an example embodiment, a LPD instruction fetches (loads) two operands from two independent locations in main memory to respective general purpose registers (GPRs) without any sort of interlocking. Thus, another central processing unit (CPU) (or processor) of the multi-processor computing environment may have performed a store to one or part of one memory location having one of the operands. Thus, the two operands loaded in the GPRs do not reflect a consistent steady state representation. Disjoint operand instructions such as LPD may indicate that the operation was atomic as if it had been interlocked by, for example setting condition codes reflecting whether the two operands were not exposed to an intervening store by another processor during execution of the atomic disjoint instruction. These operands may be in main storage that is available to other CPUs of a multi-processor system or I/O devices or both. It is desirable to emulate such a disjoint operand instruction. One such disjoint instruction is the aforementioned Load Pair Disjoint (LPD) instruction that loads two operands. Other disjoint instructions might, for example Store two operands to disjoint memory locations, load one or more operands and store one or more operands at disjoint memory locations, or simply load or store a single large operand (perhaps 64 bytes or more) without interlocking.

Figure 9:
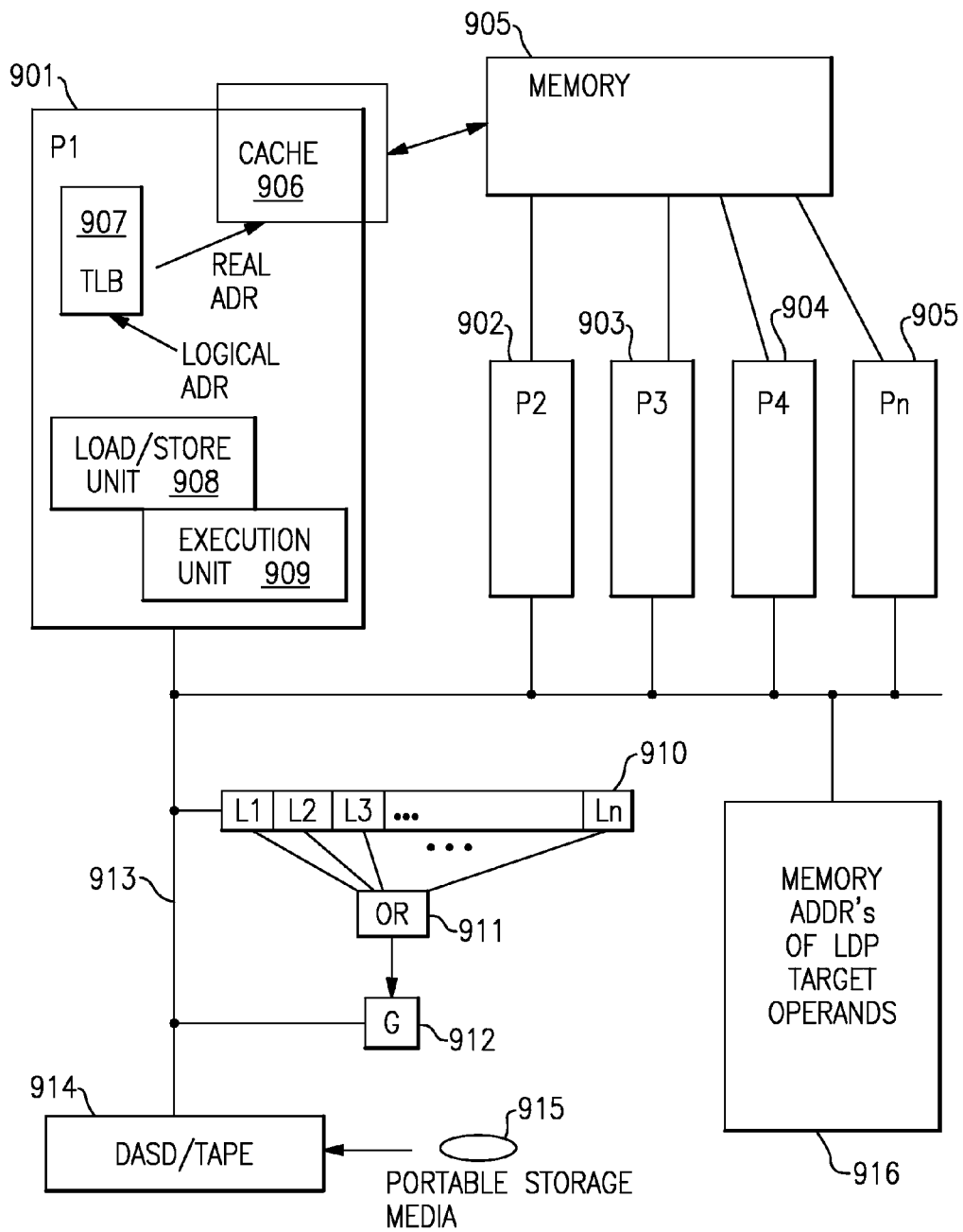
FIG. 9 depicts an example multi-processor system according to the invention.

Referring to FIG. 9 in an example embodiment, a multi-processor system is depicted. Of course, other embodiments may well be practiced using the teaching of the present invention, however FIG. 9 is presented to exemplify one way of carrying out the invention. The system comprise a plurality of processing units 901 902 903 904 905 of an n way multi-processor. Each processor may have an execution unit 909 for executing functions of instructions, a Load/Store unit 908 for loading (fetching) and storing data (operands) to/from memory. The processor typically provides a logical (virtual) address for programs to use. The logical address is transformed to a real (absolute) address by way of Dynamic Address Translation (DAT). DAT is typically performed by accessing DAT tables using the logical address to find the real address. Since this is time consuming a cache of such translations is maintained in a Translation Lookaside Buffer 907 for quicker access. blocks of memory 905 information are also cached in a local cache 906 in order to speed up memory operations. Loads/Stores to memory may be buffered in the cache 906 to avoid frequent memory accesses. Many computer systems employ several levels of caches between a processor and memory 905. In fact, memory 905 is a cache of pages paged from even slower "permanent store" such as DASD 914. Such permanent store may employ portable media 915 such as tape or disc.

According to one embodiment of the invention, a local state (Ln) 910 is maintained corresponding to each processing unit. Thus, processing unit P1 has a corresponding local state L1. In an embodiment each Ln has a bit x for indicating, when '1' that a LPD instruction is being executed and a bit y for indicating, when 1 that another processor may have stored to an LPD operand of the processor Pn. In the embodiment, a Global state is 912 also provided that is the logical OR 911 of each of the x bits. The Ln 910 and G 912 information is available to all processors. Furthermore, in the embodiment, a table 916 available to all processors is provided that holds memory addresses of any LPD being executed by any of the processing units Pn.

The computer hardware instruction Load Pair Disjoint (LPD) loads data operands from two disjoint (separately addressed) memory locations into two different general purpose registers and sets a condition code to indicate whether or not the memory locations, when observed by other CPUs in the system, appeared to have been accessed as a single atomic operation (as if the loads had been interlocked) such that there were no intervening store operations that may have modified the operands being loaded. The data operands are not actually interlocked to prevent storage from other entities (such as other CPUs or I/O operations) so the machine dependent determination that there may have been an intervening store are used to set condition codes accordingly.

Although a program that uses LPD preferably must be written in such a way to deal with the case when this disjoint operation always fails (since the operands are not necessarily actually interlocked during the load operation). Therefore, much better performance is possible if the operation succeeds as if interlocked the first time.

Implementing the behavior of this instruction in an emulator is difficult when a similar instruction is not present in the emulation target hardware's architecture (the native processor architecture being used to emulate operations of a Guest processor architecture).

Although most computer architectures do contain instructions to perform atomic operations there may be only a single memory operand that can be specified in these instructions, so loading operands from two disjoint locations in an atomic operation is not directly possible.

A trivial solution is to simply always fail to perform the disjoint loads as an atomic operation and set the condition code accordingly to indicate this failure. This is undesirable for performance, as it would force an emulated program that contains an LPD instruction to always have to execute along the more expensive (slower) back up path after a program dependent number of attempts. Furthermore, there may not be such a fall-through backup path in the program being executed, if for example, it was written for a uni-processor environment.

I. Load Pair Disjoint by Tracking Active State:

An example method to implement load pair disjoint type instructions is provided so that they can successfully complete in many cases. In an emulation environment, this method, termed LPD state tracking, does not require any target hardware support in the native processor of a native architecture (performing the emulation of the guest processor of a guest architecture) for atomically loading from disjoint memory locations.

For clarity in describing the LPD state tracking method, an example approach is presented that outlines the general method to be used. An enhancement to improve the overall performance of this solution is also presented.

LPD State Tracking— A First Example Approach:

In an embodiment, the load pair disjoint instructions of the Guest program are emulated on the native computer system with a pair of standard memory load instructions of the target (native) architecture. Atomicity of these standard load instructions across emulated CPUs is detected by introducing extra state to track when an LPD instruction is active on one CPU and also to track what operand addresses the LPD is reading.

This extra state is used to detect overlapping writes to the LPD addresses of LPD operands, for example, while the LPD instruction is being emulated on a first CPU, no other emulated CPUs are writing to the LPD memory addresses. If there are no overlapping writes seen while the LPD emulation is executing the LPD function, then a pair of non-atomic load instructions are sufficient to emulate an atomic disjoint load instruction. Other implementations are possible, for example:

detecting that there were no writes at all during the LPD operation, detecting that there were no writes to memory locations having the operands during the LPD operation and detecting that there were no writes to cache during the LPD operation for example.

In an embodiment, the extra state to implement this approach may be labeled "lpd_state' and the operand addresses of operands of an executing LPD instruction labeled lpd_address1 and lpd_address2 for example:
lpd_state=[on,off,dirty]
lpd_address1//LPD operand one virtual address
lpd_address2//LPD operand two virtual address
wherein the lpd_state maybe on, off or dirty, the lpd_address1 being the memory address of one operand and lpd_address2 being the memory address of a second operand are all kept as part of each emulated CPU's state.

In addition a global variable, live across all emulated CPUs, global_lpd_state=[on,off] is preferably also maintained. This global variable is not strictly required but saves work as all the CPUs do not always have to be examined.

Preferably lpd_address1 and lpd_address2 contain, when global_lpd_state and lpd_state are both set to 'on' contain the virtual address of the LPD's operand 1 and operand 2 memory locations, respectively.

Accordingly, (FIG. 10) the emulation routine that emulates the LPD on the native computer system will do the following:
1. The LPD emulation routine sets the lpd_state (Ln) 1001 for the current CPU from 'off' to 'on' and the global_lpd_state 912 to 'on' (x=1).
2. The address of each LPD operand is placed in CPU fields: lpd_address1 and lpd_address2 1002.
3. The load of each LPD operand from memory 1003 is performed using standard load instructions and the emulated CPU general register is updated with the loaded values.
4. The lpd_state is used to set the condition code of the LPD operation. If 1004 lpd_state is 'on' then condition code is set to the success code 1006, otherwise if lpd_state is 'dirty' then the condition code is set to the failure code 1005.
5. The lpd_state and the global_lpd_state are both set to 'off' 1007 and the LPD emulation routine exits.

Figure 11:
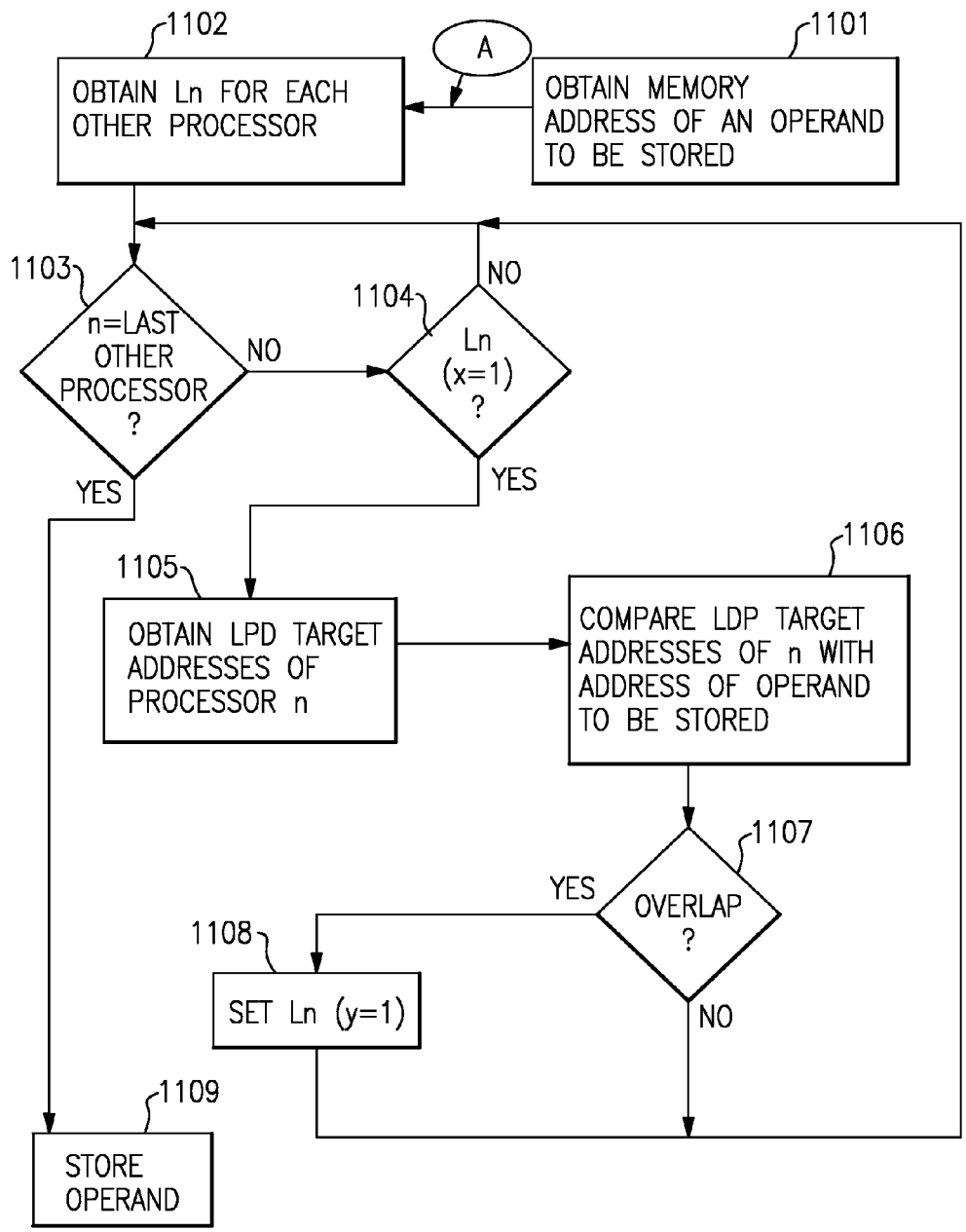
FIG. 11 is a diagram depicting an example execution of a store instruction.

An example emulated instruction that stores to memory FIG. 11 must do the following:
1. If the global_lpd_state is 'on' 1104 then check the lpd_state of every other CPU in the system.
2. If any CPU's lpd_state is set to 'on' then, for that CPU, compare 1106 the address the current store is writing to against the lpd_address1 and lpd_address2 fields.
3. If there is any overlap 1108 between the store's address and the LPD's addresses then set the lpd_state on the CPU where the overlap is found to 'dirty' state.
4. Complete the store instruction 1109.

In the optional embodiment, if global_lpd_state 912 is not implemented, each CPU performing a store much check the lpd_state 910 of each of the other CPUs. In all cases state changes to the lpd_state variable from off→on and from on→dirty must be performed with platform dependent atomic operations to ensure correctness.

In addition, updates to any the state variables may require subsequent platform dependent synchronization instructions to be executed to ensure that the updates can be observed by all CPUs.

While the above approach will emulate load pair disjoint instructions and return successful completion in many cases, extra work must be done on every store instruction at all times. In other words all stores will be slowed down in order to make LPD faster. As store instructions may be many times more common then LPD instructions the following Enhanced Approach may be employed.

LPD State Tracking— A Second Approach

The overhead of this approach can be reduced by leveraging the emulated memory management unit of the emulator. This improved method described in this disclosure assumes that the emulated memory management unit is software based and contains one or more levels of a software implemented Guest Translation Lookaside Buffer (TLB) for each guest CPU. The TLB may be a TLB0 as described supra.

Every memory access by a guest CPU initially checks in the first level of the TLB. This first level is a simple mapping between virtual and absolute addresses. As is known in the art, a hit on this TLB level allows the already translated virtual address to be immediately used. If this TLB level misses then further lookups in deeper levels of the TLB or a full translation may be required.

Figure 12:
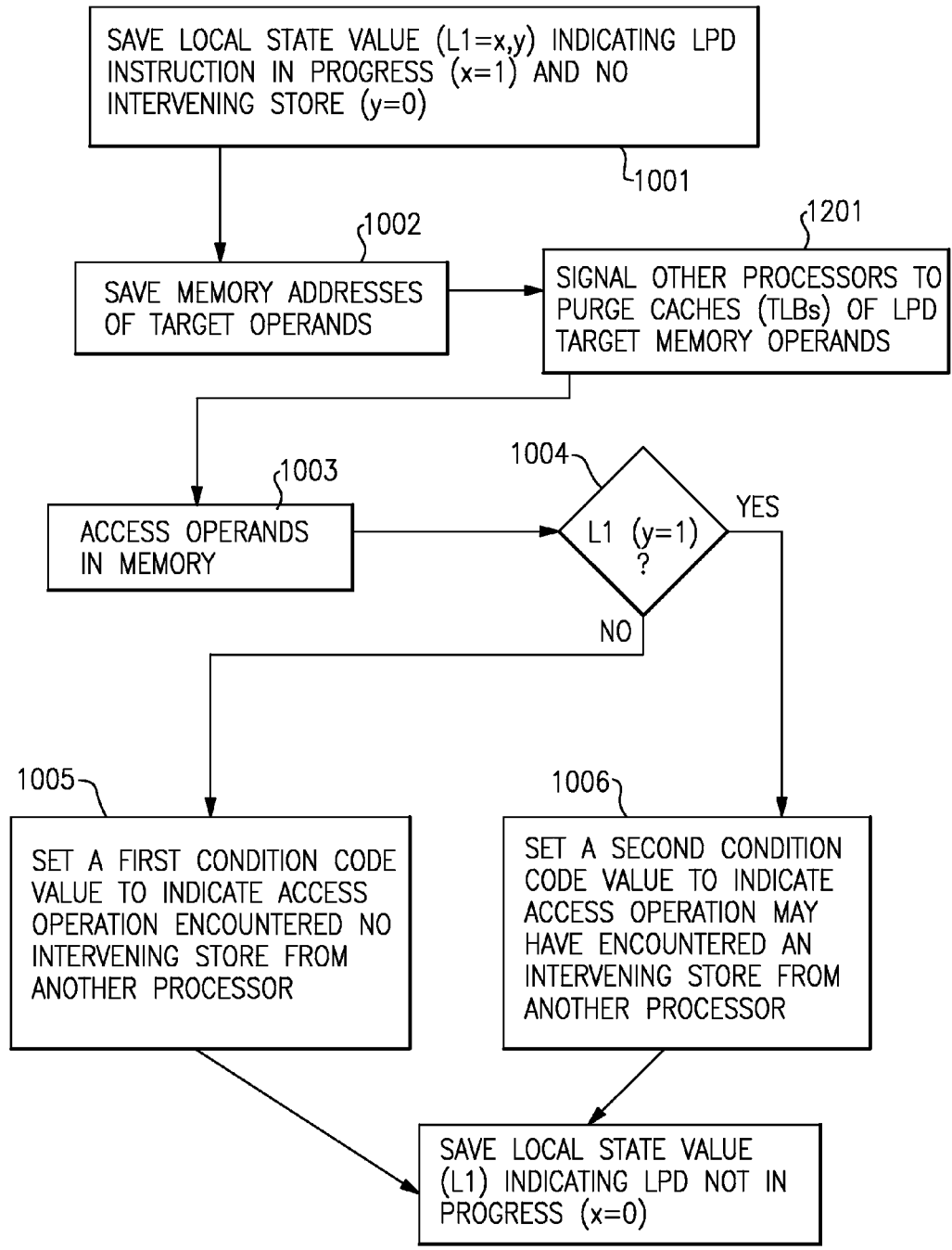
FIG. 12 is a diagram depicting an alternative example execution of a disjoint store instruction.

Referring to FIG. 12, by selectively purging 1201 entries from this first level of TLB of each of the other CPUs of the LPD operand addresses, only the CPU executing the LPD instruction has LPD operand addresses in the TLB.

In other words a hit in the first level of the TLB of a CPU guarantees that the store address does not overlap with any active LPD memory operand location.

To support this new method the LPD emulation routine will now do the following. The added step from the algorithm above is step 3.
1. The LPD emulation routine sets the lpd_state for the current CPU from 'off' to 'on' and the global_lpd_state to 'on'.
2. The address of each LPD operand is placed in CPU fields: lpd_address1 and lpd_address2.
3. All other CPUs are asked 1201 to remove first level TLB entries that match LPD_address1 and lpd_address2 from their TLBs.
4. The load of each LPD operand from memory is performed using standard load instructions and the emulated CPU register state is updated.
5. The lpd_state is used to set the condition code of the LPD operation. If lpd_state is 'on' then condition code is set to the success code, otherwise if lpd_state is 'dirty' then the condition code is set to the failure code.
6. The lpd_state is set to 'off' and the LPD emulation routine exits.

Figure 13:
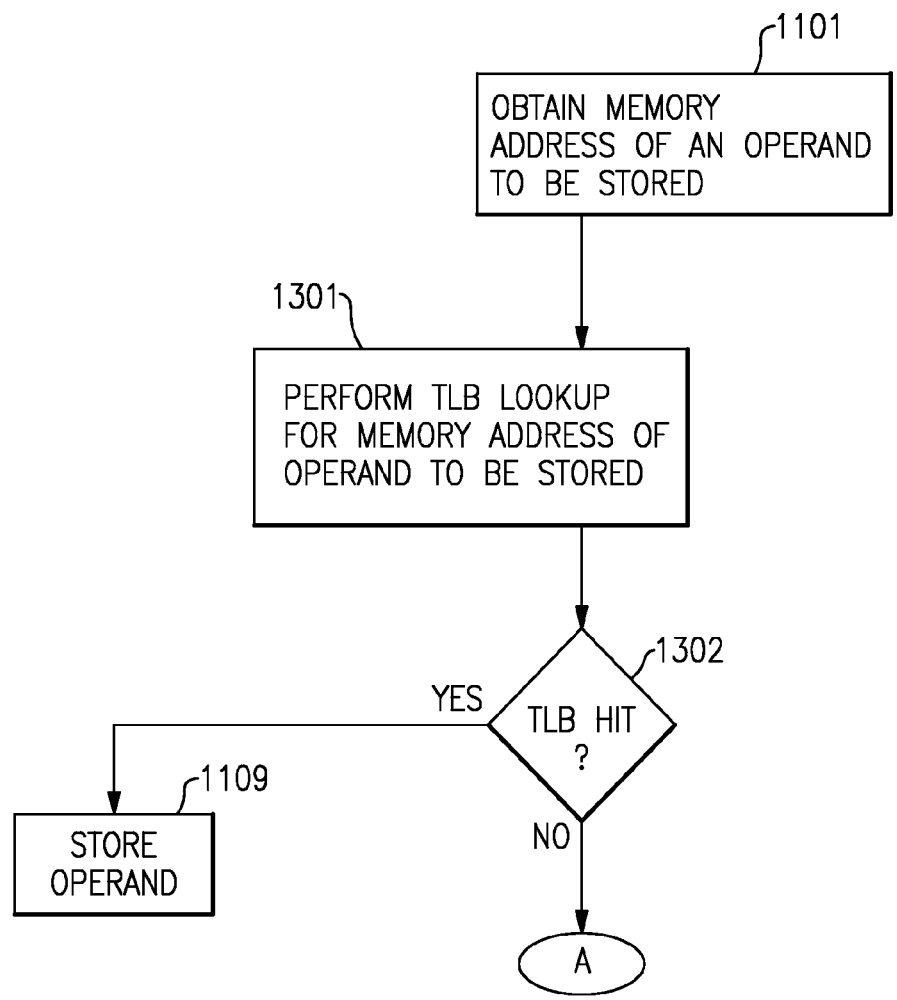
FIG. 13 is a diagram depicting an example alternative execution of a store instruction.

Referring to FIG. 13, an instruction that stores to memory in this embodiment may do the following:
1. Perform a first level TLB lookup 1301 for the store address.
2. If 1302 a match is found in the first level TLB lookup then proceed 1109 with the store instruction as normal.
3. If 1302 the first level TLB lookup fails A then call into a general TLB miss handler and do the following:
   a. If the global_lpd_state is 'on' then check the lpd_state of every other CPU in the system.
   b. If any CPU's lpd_state is set to 'on' then for that CPU compare the address the current store is writing to against the lpd_address1 and lpd_address2 fields.
   c. If there is any overlap between the store's address and the lpd's addresses then set the lpd_state on the CPU where the overlap is found to 'dirty' state.
4. Complete the store instruction as normal.

Therefore in the common case (perhaps over 90% of the time) no extra work (performance overhead) is required to effectively support LPD instructions as the store instructions will usually find the address in the first level TLB.

This approach has the added advantage that by utilizing the forced first level TLB miss mechanism support for LPD instructions can be naturally extended for emulators that contain a Just-In-Time (JIT) compiler. In this case all store instructions can be compiled as normal by the JIT and failed lookups in the first level TLB can be handled in a common routine for TLB misses, as described above. In some implementations, a common shared first level TLB is used for all CPUs. The present invention would work for such an implementation as well.

As has been shown in FIG. 12, when executing a disjoint instruction (LPD) instruction a local state "Ln" is provided for each processing unit "Pn" 910 preferably containing two bits each, x and y. The x bit 1001, when 1 indicates the processor is executing an LDP instruction. The y bit 1001, when 1 indicates that other processor may have corrupted the atomicity of LPD by storing to one of the LPD operands while they were being fetched by the LPD execution. The execution of the LPD instruction causes the memory addresses of source (target) operands to be saved 1002 in, for instance, a table 916 accessible to all Processing units. The operands of LPD are fetched and a test is made 1004 to determine if an intervening store may have occurred from another processing unit (y=1) potentially corrupting the atomic operation. If so (y=1), condition code values are set 1006 to indicate the access operation may have been corrupted. If y=0, than no corrupting intervening store has occurred and condition code values are set 1005 indicating the operands were accessed without being corrupted. Finally 1007, the local state value x is reset (x=0) indicating the LPD is no longer being executed. It should be noted that the terms "source operand" and "target operand" are used interchangeably herein, an operand may be the "source" operand when being fetched but is also the "target" operand of a memory access whether being fetched or stored according to the function of the instruction.

Referring to FIG. 11, a store instruction is executed causing a memory address to be stored 1101, the memory address of an operand to be stored in memory. For each other processor 1103 having a local state L indicating an LPD is in progress (x=1) 1104, the corresponding LPD target addresses are obtained 1105 and compared 1106 with the target of the store instruction. If 1107 they overlap, the local state L for that processor is modified (y=1) to indicate that the store may have corrupted the LPD operand. After all other processors having x=1 have been tested, the target operand of the store instruction is stored in memory 1109.

Figure 10:
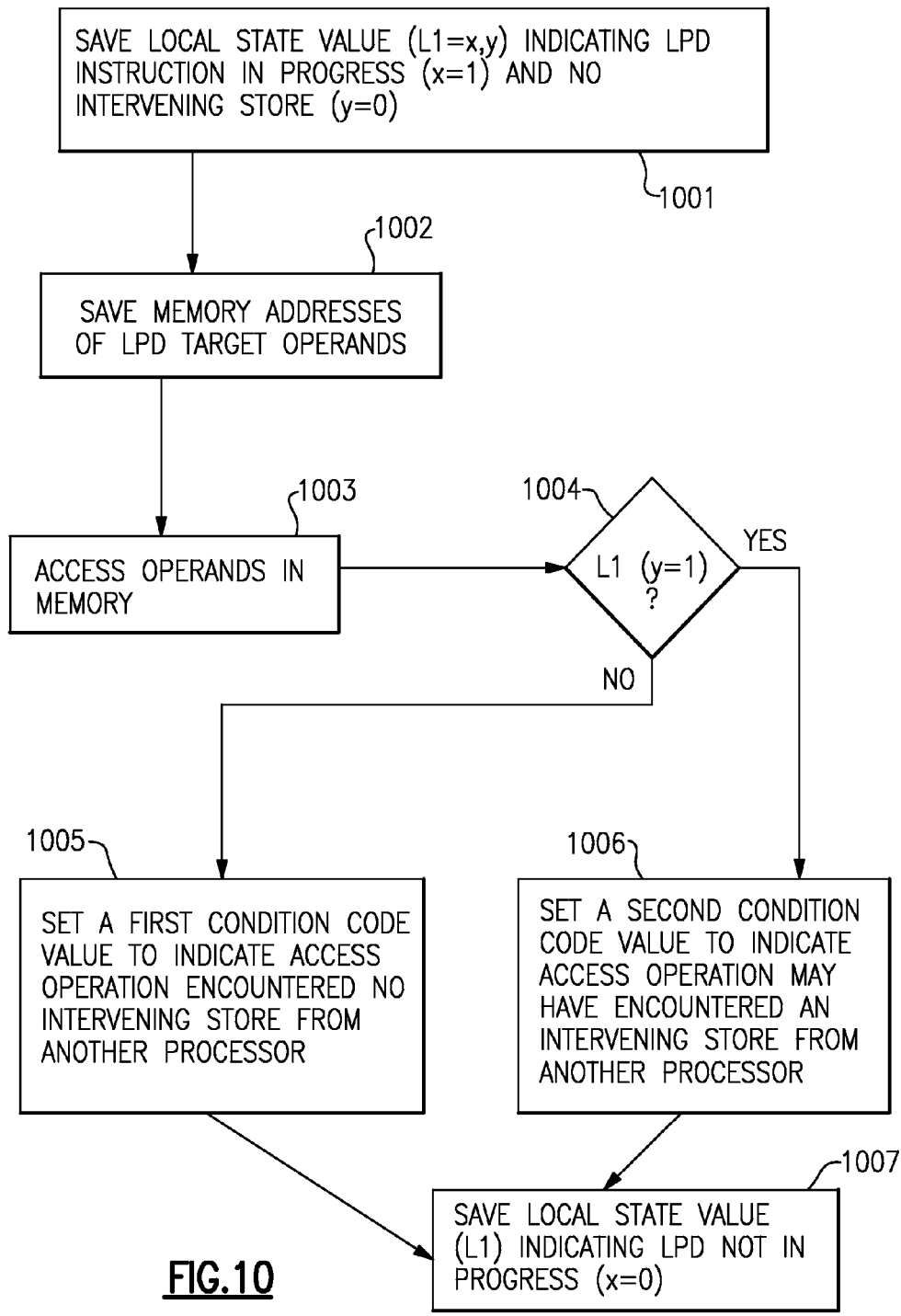
FIG. 10 is a diagram depicting an example execution of a disjoint store instruction.

Referring to FIG. 12, in another embodiment, an additional action to those of FIG. 10 is taken 1201 during the execution of the LPD instruction. In this action 1201 the other processor units Pn of the multi-processor system are signaled to purge TLBs of entries corresponding to the address of the LPD target memory operands. As shown in FIG. 13, a store instruction in this embodiment would obtain 1101 a memory address of an operand to be stored as in FIG. 11 but would perform 1301 a TLB lookup for memory address of the operand to be stored. If 1302 there was a TLB hit, the store instruction would proceed to store the operand without further delay. However, if 1302 there was a TLB miss the operation would proceed A to check other processors for the L state (x=1) as in FIG. 11.

II. Emulating Load Pair Disjoint Execution by Using Target Hardware Instructions:

In an embodiment, in certain special cases, the single memory operand atomic native instructions are used that are more commonly available in order to successfully emulate load pair disjoint instructions.

Directly Using Target Hardware Instructions to Emulate LPD:

Depending on the size of the LPD memory operands and the separation between these memory locations it may be possible to use a higher performing, platform specific sequence, to emulate the LPD instruction.

For certain size and separation combinations atomic instructions that are typically supported on many target architectures can be directly used in such a way as to successfully emulate an atomic disjoint load.

For example, on an x86-64 Intel® processor emulation target of an IBM® z/Architecture® LPD instruction may detect 4 byte memory operands at disjoint memory locations and these memory locations may be separated by eight or fewer bytes, than a native atomic instruction fetching a 16 byte (or greater) operand can be used. The Intel® Itanium® Architecture Software Developer's Manual. Volume 3 instruction set reference Intel® Document Number 245319-005 incorporated by reference herein, describes instructions including a "LOCK cmpxchg16B" instruction.

In an example implementation, a "cmpxchg16B m128" instruction with a LOCK prefix can perform an atomic operation accessing a 16 Byte block of memory atomically and putting the block in a pair of registers. When a condition is determined by the emulator that the operands of the LPD are in the same 16 Byte block of memory, the instruction is invoked to emulate execution of the LPD guest instruction.

The example x86-64 instruction 'cmpxchg16B m128' can be used with a LOCK prefix so that it executes atomically. The semantics of the cmpxchg16B m128 instruction compares the 16 bytes of a designated memory location (m128) with data in a concatenated pair of registers (rdx, rax) and if they are equal, loads data from another concatinated pair of 8 byte registers (rcx, rbx) into the (mem1 and mem1+8) memory locations, however if they are not equal, the block of data from memory is loaded into the first pair of registers (rdx, rax). Thus, if the second pair of registers were first loaded with the block of data, the LOCK cmpxchg16B m128 instruction can be used to make sure the results are as if the load were atomic. If the compared data is not equal then load the 8 bytes of data from memory location mem1 to the register rdx and the 8 bytes of data from memory location mem1+8 bytes to the register rax and clear the ZF flag in the x86 eflags condition register. The semantics of the cmpxchg16B m128 instruction are:

```
if ([rdx:rax] = [m128])
    [m128] = [rcx:rbx];
    set ZF in x86 eflags
else
    [rdx:rax] = [m128]
    clear ZF in x86 eflags
```

If the LPD source operands are separated by 8 bytes in memory and the first address (mem1) is 16 byte aligned, then the following x86-64 sequence can be used to simulate the LPD even though there is no inherent platform support for a disjoint load operation.

```
// mem1 is the translated LPD operand1 address
// mem2 is the translated LPD operand2 address
// mem1+8 = mem2
Inst1: mov rcx,rdx
    "move 8 bytes of data from register rdx to register rcx"
Inst2: mov rbx,rax
    "move 8 bytes of data from register rax to register rbx"
Inst3: LOCK cmpxchg16B [mem1]
```

After this sequence is complete then the 64 bit registers, rdx and rax, will each contain in their 32 bit (4 byte) high halves, respectively, the contents of the disjoint memory locations specified in the LPD instruction. These register values can then be used to update the emulated CPU's register values.

For this and similar special cases of separation, size and alignment, Inst3 (Intel cmpxchg16B) is an effective atomic disjoint load.

To Demonstrate Why this is True Consider Two Cases:

1. The 16 byte value in the registers rdx and rax is already equal to the 16 byte value at mem1. In this case then the 'if' part of the cmpxchg16B logic above will be taken and the same 16 byte value in rdx:rax will be stored at the mem1 through the copies in the registers rcx and rbx.

2. The 16 byte value in the registers rdx and rax is not equal to the 16 byte value at mem1. In this case then the 'else' part of the cmpxchg16B logic above will be taken and the current value at mem1 will be atomically loaded into the registers rdx and rax.

Similarly, an LPD instruction with 8 byte memory operands can also use a cmpxchg16B instruction. However, the separation in this case must be 0 and as before the mem1 address must be 16 byte aligned.

In the special case of an LPD instruction with 4 byte memory operands and a separation of 0 then the smaller size cmpxchg8B instruction can be used. This instruction also has an advantage over cmpxchg16B as 16 byte alignment in not required.

In most computer architectures, under special conditions, certain instructions exist to load multiple words of data from memory without permitting intervening store operations to the location. An architecture may provide a Move Block Atomically (MBA) instruction that moves a block of data into registers (or a memory location) without permitting an intervening store from another CPU of a multiprocessor system for example. An emulator testing for a LPD operand arrangement where such an instruction can move both operands into registers (or memory) could use the MBA instruction to fetch both operands atomically.

Thus, the LPD instruction can accomplish a successful load of both operands by employing an architecture dependent atomic instruction for those operands that are arranged within the bounds of the atomic operation. This would be done by first testing for the operands being so arranged and using the atomic operation when that is true but using other techniques when it is not true.

As most computer architectures support some form of a compare and exchange atomic instructions similar techniques can be used to emulate an atomic disjoint load if the memory operands have the proper separation, size and alignment.

Figure 14:
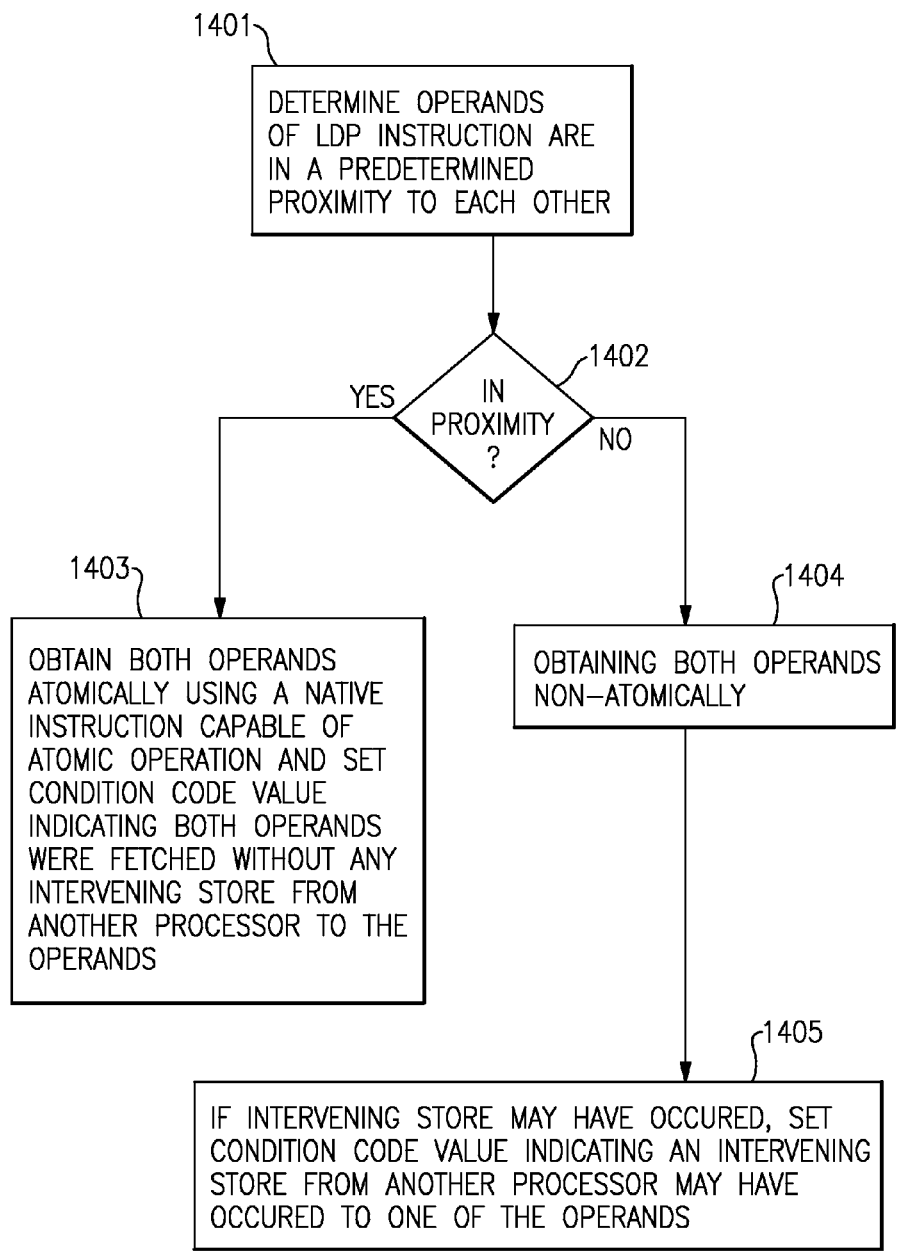
FIG. 14 is a diagram depicting an example LPD execution based on proximity of operands.

Referring to FIG. 14, execution of an LDP guest instruction is emulated by a native (host) processor. The emulation routine determines 1401 if the LDP instructions are within a predetermined proximity to one another. This determination can be based on native architecture supporting atomic operations. Examples include 16 bytes as previously shown or other implementation dependent factors such as guest cache line management or guest page management for example. If 1402 the LPD operands are in proximity 1403, both operands are atomically accessed without possibility of any intervening store and condition codes are set indicating atomic access. On the other hand, if both operands of LPD are not in proximity, they are fetched using a machine dependent routine and 1405 if an intervening store may have occurred, condition codes are set indicating the operands may have been corrupted during the LPD access. In an embodiment not shown, if both operands are not proximate, the native emulation routine may serialize and/or use native locking actions to guarantee that no other processor can store to the operands being accessed and therefore, always set condition codes indicating atomic access. On the other hand, an embodiment not shown could always set condition codes indicating atomic access failed in the cases where the operands were not proximate.

While the present invention is described in an emulation embodiment, the invention could also be practiced in hardware employing integrated circuitry to perform some or all of the function. Furthermore, the teaching of herein provide those of average skill in the art with knowledge that are enabling for making embodiments possible using any one of or combinations of logic circuits, microcode (firmware) or software code (emulation).

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 8:
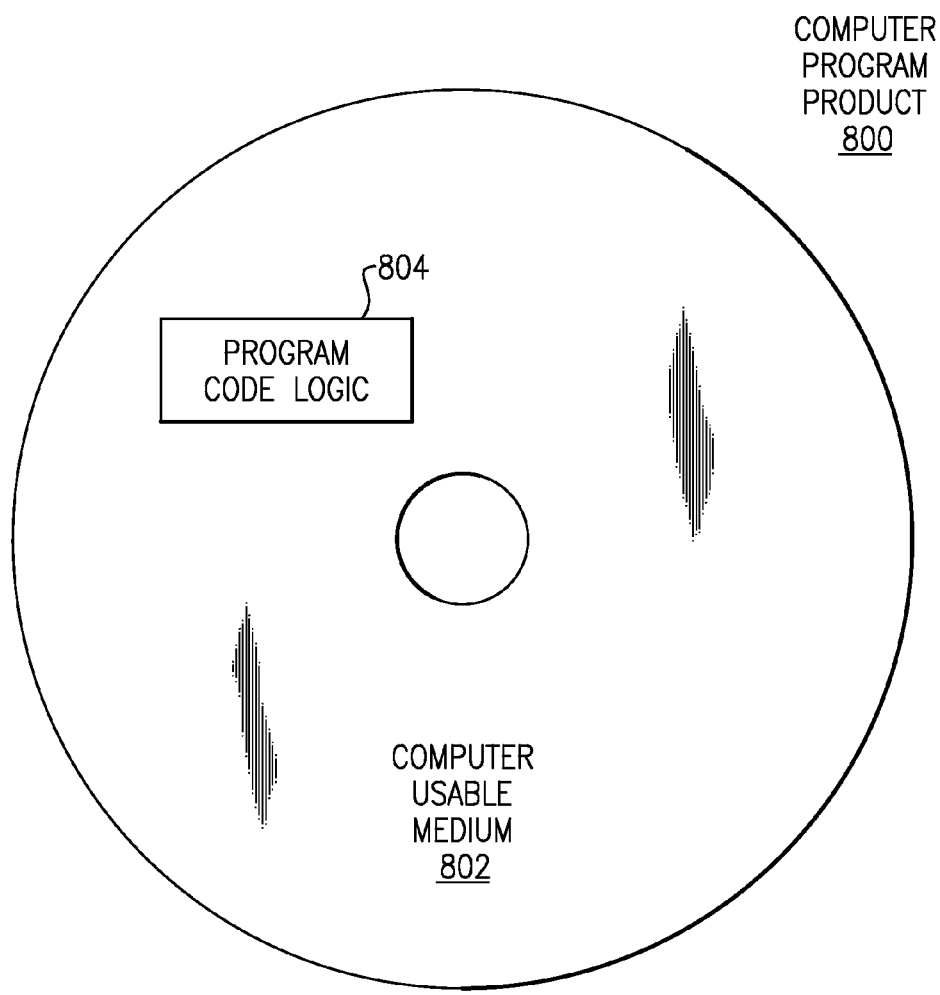
FIG. 8 depicts one embodiment of a computer program product incorporating one or more aspects of the present invention.

One example of an article of manufacture or a computer program product incorporating one or more aspects of the present invention is described with reference to FIG. 8. A computer program product 800 includes, for instance, one or more computer usable media 802 to store computer readable program code means or logic 804 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a data structure of readily accessible units of memory is provided. By employing this data structure, memory access and system performance are enhanced (e.g., faster). The data structure includes designations (e.g., addresses) of one or more units of memory (e.g., pages) that while in the data structure do not need address translation or any other test to be performed in order to access the unit of memory. This data structure can be used in any type of processing environment including emulated environments.

Although various embodiments are described above, these are only examples. For instance, one or more aspects of the present invention can be included in environments that are not emulated environments. Further, one or more aspects of the present invention can be used in emulated environments that have a native architecture that is different than the one described above and/or emulates an architecture other than the z/Architecture®. Various emulators can be used. Emulators are commercially available and offered by various companies. Additional details relating to emulation are described in *Virtual Machines: Versatile Platforms For Systems and Processes (The Morgan Kaufmann Series in Computer Architecture and Design)*, Jim Smith and Ravi Nair, Jun. 3, 2005, which is hereby incorporated herein by reference in its entirety.

Further, the processing environment can include multiple central processing units, each having an emulator and providing a guest operating system and guest applications. As further examples, the emulator and the various components of the emulator can be different than described herein, or there can be additional or less components than described herein. Although the examples described herein refer to pages as the units of memory, other sizes of memory can also benefit from one or more aspects of the present invention. Further, the designations can be other than addresses, and in particular, can be other than logical and/or host absolute addresses. Many other variations are possible without departing from the spirit of the present invention.

Further, a data processing system suitable for storing and/ or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail there, it will be apparent to those skilled in the relevant art that various modifications, additions, substitutions and the like can be made without departing from the spirit of the invention and these are therefore considered to be within the scope of the invention as defined in the following claims.

What is claimed is:

1. A non transitory computer program product for emulating execution of a disjoint storage access instruction of a first processor architecture in a second processing unit of a plurality of processing units of a second processor architecture in a shared memory environment, the computer program product comprising a tangible storage medium readable by a processing circuit and storing instructions for execution by the processing circuit for performing a method comprising:

emulating execution of the disjoint storage access instruction comprising:
determining that two operands of the disjoint storage access instruction to be fetched can be fetched atomically based on proximity of the two operands in memory;
responsive to the two operands being within the proximity, executing an atomic instruction of the second processing unit to atomically fetch the two operands and setting a condition code to a first value indicating the two operands of the disjoint storage access instruction were fetched atomically with no intervening store to the two operands from another processor; and
responsive to the two operands not being within the proximity, executing non-atomic instructions of the second processing unit to fetch the two operands and responsive to detecting that an intervening store may have occurred to an operand of the two operands, setting the condition code to a second value indicating that an intervening store may have occurred to one of the two operands.

2. The method according to claim 1, further comprising:
responsive to detecting that an intervening store may have occurred to an operand of the two operands during the execution of the non-atomic instructions, setting the condition code to a second value indicating that an intervening store may have occurred to one of the two operands.

3. The method according to claim 2, wherein the proximity is any one of 16 bytes, a cache line or a memory page of pageable store.

4. The method according to claim 1, wherein the proximity is any one of 16 bytes, a cache line or a memory page of pageable store further comprising:
responsive to detecting that an intervening store may have occurred to an operand of the two operands during the execution of the non-atomic instructions, setting the condition code to a second value indicating that an intervening store may have occurred to one of the two operands.

5. A computer system for emulating execution of a disjoint storage access instruction of a first processor architecture in a second processing unit of a plurality of processing units of a second processor architecture in a shared memory environment comprising:

a memory;
a processing unit in communication with the memory wherein the computer system is capable of performing a method comprising:
emulating execution of the disjoint storage access instruction comprising:
determining that two operands of the disjoint storage access instruction to be fetched can be fetched atomically based on proximity of the two operands in memory;
responsive to the two operands being within the proximity, executing an atomic instruction of the second processing unit to atomically fetch the two operands and setting a condition code to a first value indicating the two operands of the disjoint storage access instruction were fetched atomically with no intervening store to the two operands from another processor; and
responsive to the two operands not being within the proximity, executing non-atomic instructions of the second processing unit to fetch the two operands, and responsive to detecting that an intervening store may have occurred to an operand of the two operands, setting the condition code to a second value indicating that an intervening store may have occurred to one of the two operands.

* * * * *